UNITED STATES PATENT OFFICE.

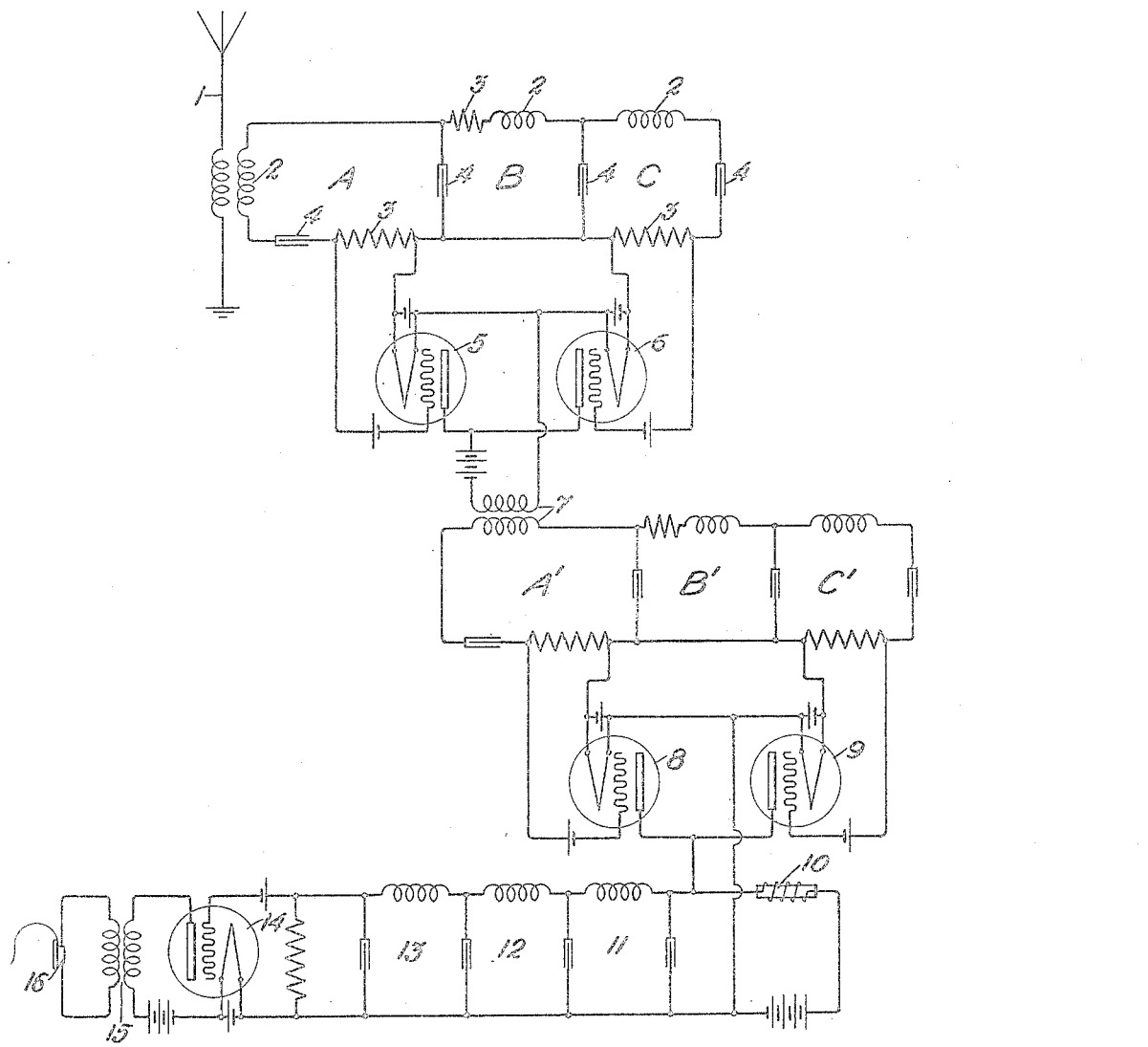

JOHN MILLS, OF WYOMING, NEW JERSEY, ASSIGNOR TO WESTERN ELECTRIC COMPANY, INCORPORATED, OF NEW YORK, N. Y., A CORPORATION OF NEW YORK.

RADIO-RECEIVING SYSTEM.

1,385,090.     Specification of Letters Patent.     Patented July 19, 1921.

Application filed February 19, 1916. Serial No. 79,441.

*To all whom it may concern:*

Be it known that I, JOHN MILLS, a citizen of the United States, residing at Wyoming, in the county of Essex and State of New Jersey, have invented certain new and useful Improvements in Radio-Receiving Systems, of which the following is a full, clear, concise, and exact description.

This invention relates to radio receiving systems, and particularly to apparatus for neutralizing the effect of impulsive disturbances in such systems.

Its object is to provide means whereby a discrimination is effected between the effects of impulsive and of periodic excitation of a network. By impulsive excitation of a network is meant an excitation produced by a non-oscillatory voltage of a given magnitude which is suddenly applied and removed, or by an electromotive blow such as is produced by the so-called static disturbances of the atmosphere. A periodic excitation is one produced by a sustained voltage that is oscillatory in character. This object is accomplished by making use of the fact that the free oscillations in the various sections of a recurrent network, produced by such an impulsive excitation as a static disturbance, for example, maintain certain invariable phase and amplitude relations for each mode of oscillation, irrespective of the damping of the network, while the forced oscillations, due to a signal to be received, are attenuated and altered in phase in passing along the network.

The manner in which advantage is taken of this fact will be described in detail in connection with the drawing which represents a receiving station constructed in accordance with this invention. In the drawing, 1 represents a preferably highly damped receiving antenna coupled to the three-section network, A, B, C, which consists of three similar sections, each containing an inductance coil 2, resistance 3 and condensers 4. This network may have a great variety of forms, of which that in the drawing is typical.

When such a network is impulsively excited at one end, a free oscillation is set up, which, in the case shown, will have the property that each of the component currents of the meshes A, B, C, will be the resultant of three sinusoidal oscillations, whose frequencies and damping constants are the same throughout the network. This is a well-known property of the free oscillations of such a system having several degrees of freedom and may be arrived at from the consideration of the mathematical conclusions stated by Heaviside on page 127, volume 2, of his treatise on "Electromagnetic theory."

It may be proved that if $a^1$, $a^2$, $a^3$ are the sinusoidal components in the mesh A, in the free oscillation of the system the corresponding components in the last mesh C will have the same magnitude, but the phase of one component will be reversed with respect to that of the corresponding one of mesh A. It will therefore be possible to balance out two of the component oscillations by opposing their effects in a receiving instrument, and thereby to neutralize a portion of the impulsive disturbance.

Since this property holds independently of the damping of the network, it is possible to insert resistance in such a way that the attenuation offered to steady alternating currents is large, and the effects of these currents will not neutralize in a receiving circuit coupled to the meshes A and C. Discrimination between the two effects is therefore possible.

5 and 6 represent two thermionic amplifiers which are employed to combine the effects of the currents in meshes A and C. The input circuits of these amplifiers are so connected, for example, across the resistances 3 of the two meshes that two of the modes of free oscillations may cancel. The amplitude of the impulsive disturbances appearing in the common output circuit of these two amplifiers is therefore less than it would be in the absence of such balancing. On the other hand, on account of the resistances 3 of the network, a steady alternating current, for example, that due to a signal, is more attenuated upon reaching the mesh C than upon reaching the mesh A, and if this difference in attenuation is made large, it will be clear that the effects of the steady alternating current are not neutralized in the common output circuit of the two amplifiers. In fact, the current appearing there may be made practically as large as the current which would flow were the amplifier 6 disconnected. It is desirable to use elements of the type shown because these are unilateral with respect to transfer of power, and thus prevent reaction of the detecting circuits upon the network A, B, C. There has thus been effected a discrimination between the currents, due to impulsive excitation and to steady excitation, the ratio of the two being reduced in the common output circuit of amplifiers 5 and 6.

This process of discrimination may be repeated. For example, in the drawing a second discriminating network $A^1$, $B^1$, $C^1$ is shown connected to the first by means of the transformer 7. The two amplifiers 8 and 9 have functions similar to those of 5 and 6, and their common output circuit is connected preferably to a suitable resonant network, such as 11, 12, 13, which leads to the input circuit of a detector 14. The output circuit of this detector supplies the telephone receiver 16, or other translating device, by means of the transformer 15.

The high inductance choke coil 10 is inserted in order that current may be supplied to the output circuits of the two amplifiers 8 and 9 without permitting a short-circuit of the high-frequency currents.

It will be clear that any suitable form of detecting circuit may be inserted on the output side of this discriminating device. It will further be clear that this invention may be used for transmission over wire lines, in case it is found necessary there to discriminate between the effects of signals and impulsive electromotive forces. It may also be applied to radio or wire systems for the selective operation of any desired mechanism.

What is claimed is:

1. A radio receiving system comprising an antenna, selective means for progressively attenuating impressed alternating currents, said means including a series of circuit sections, and a detecting device differentially connected to two such sections.

2. A radio receiving system comprising an antenna, selective means for progressively attenuating impressed alternating currents, said means including a series of circuit sections, two unilateral elements and a translating device, said elements being so connected, respectively, to two of said sections and to the said translating device that the effects of currents in said sections are combined in said translating device.

3. A radio receiving system comprising an antenna, a complete path from the aerial portion of said antenna to ground, a recurrent network comprising elements distinct from said path coupled to said antenna, two unilateral elements whose input circuits are connected to different sections of said network, and whose output circuits are electrically connected, and a translating device connected to said common output circuit.

4. A receiving system comprising a complete receiving circuit over which incoming waves pass, an electrical network composed of a plurality of sections distinct from said receiving circuit associated with said receiving circuit, means for detecting the oscillations received over said circuit, and means associating two sections of said network at different electrical distances from said circuit with said means for detecting.

5. A receiving system comprising a receiving conductor, an electrical network composed of a plurality of sections one only of said sections being coupled to said conductor, a detector, and means for impressing the oscillations from two of said sections upon said detector.

6. A receiving system comprising a receiving conductor, an electrical network including inductance and capacity elements, said network being composed of a plural odd number of sections and associated with said conductor, an evacuated vessel of the audion type, and means for impressing the oscillations from a plurality of said sections upon said vessel.

7. A receiving system comprising a receiving conductor, an electrical network composed of more than two sections and associated with said conductor, a resistance in each of two non-adjacent sections of said network, an audion, and means for impressing the drop of potential across said resistances upon said audion.

8. A receiving system comprising a receiving conductor, an electrical network associated with said conductor and composed of a plurality of sections serially connected, a detector, and means for impressing the oscillations from two non-adjacent sections upon said detector.

9. A receiving system comprising a receiving conductor, an electrical network associated with said conductor and composed of a plurality of similar sections, an evacuated vessel a space impedance controlling element for said vessel, an input circuit connected to said element, and means for differentially impressing the oscillations in two non-adjacent sections upon said vessel.

10. A receiving system comprising a receiving conductor, an electrical network associated with said conductor and composed of a plurality of similar sections, a unilateral impedance, means for impressing the oscillations from one of said sections upon said unilateral impedance, a second unilateral impedance, means for impressing the oscillations from a non-adjacent section upon said second unilateral impedance, and a detector associated with said impedances.

11. A receiving system comprising an antenna, an electrical net work associated with said antenna and composed of a plurality of similar sections serially connected, a unilateral impedance means for impressing the oscillations from one of said sections upon said unilateral impedance, a second unilateral impedance, means for impressing the oscillations from a second section upon said second unilateral impedance, and a detector differentially associated with said impedance.

12. A receiving system comprising an antenna, an electrical network associated with said antenna and composed of a plurality of similar sections, two evacuated vessels, means for impressing the oscillations from one of said sections upon the input circuit of one of said vessels, means for impressing the oscillations from a non-adjacent section upon the input circuit of the second vessel, a detector, and means for impressing the oscillations in the output circuits of said vessels upon said detector.

13. A receiving system comprising an antenna, an electrical network associated with said antenna and composed of a plurality of sections, means for attenuating the signaling oscillations impressed upon said network while maintaining constant, irrespective of the damping of the network, certain phase and amplitude relations for the oscillations produced in said network by the impulsive excitation of said antenna, a detector, means for impressing the oscillations in said network upon said detector whereby the effect upon said detector of the oscillations produced in said network by impulsive excitation is reduced to a small value.

14. A receiving system comprising an antenna, an electrical network associated with said antenna and composed of a plurality of similar sections serially connected, a detector, and means for differentially impressing oscillations from two non-adjacent sections of said network upon said detector.

15. A receiving system comprising a receiving conductor, an electrical network composed of a plurality of sections, one only of said sections being coupled to said conductor, a translating device, and means for conveying energy from two of said sections to said translating device.

16. In a receiving system, an indicating means, a recurrent network comprising an odd number of similar sections having its adjacent sections conductively coupled, a source of input voltage for said network, and two output paths from said network to said indicating means.

17. A receiving system comprising an indicating means, a series sectional network comprising a plurality of closed sections having its various sections directly conductively connected, and two output paths from said network to said indicating means.

18. A receiving system for discriminating between signaling waves and impulsive disturbances comprising a network having a plurality of closed sections in series, means for impressing received energy upon said network, means for causing the signaling wave energy to set up oscillations of unequal amplitude in two of said sections, and means for causing the undesired energy to set up at least one kind of oscillations of the same amplitude in said two sections.

19. The method of eliminating electric disturbances in a receiving system which comprises impressing the received energy upon a network having a plurality of sections in series, causing the desired energy to set up oscillations of different amplitude and of the same phase in two of said sections, and causing the undesired energy to set up oscillations of the same amplitude and of the same phase in said two sections.

20. The method of reducing the effect of impulsive excitation in a receiving system which comprises converting the energy of the impulses into composite transient oscillations and causing the effects of selected components comprising less than all of the components of the composite transient oscillations to be substantially neutralized.

21. The method of discriminating, by means of a network of electrical impedance elements, between impulsive and periodic excitations of a receiving system, which comprises introducing the energy of both forms of excitation into the network and conducting the energy due to both forms of excitation from the network in a manner which causes opposite and balanced effects as to wave form and phase for certain definite components comprising less than all of the components of the energy due to the impulsive excitation and effects unbalanced in one or more respects as to the periodic excitation.

22. A receiving system comprising an input source of energy, a circuit means for transferring and progressively attenuating electric waves arriving from said input source, means for differentially transferring energy of certain characteristics from said circuit means, said transferring means comprising a plurality of connections to non-adjacent parts of said circuit means.

23. A receiving system comprising an input source of energy, a circuit means for transferring and progressively modifying electrical waves arriving from said input source, a plurality of output means connected respectively to non-adjacent parts of said circuit means and a common means to which energy passing through said output means is applied.

24. A receiving system comprising an input source of energy, a recurrent network of symmetrically conductive elements along which energy arriving from said source is conveyed, said network comprising sections so constructed and related that the instantaneous condition of energization of different sections produced by energy arriving from said input source is different, a pair of output means coupled to different sections of said network, and a common means to which potential differences existing in said output means are applied.

25. A receiving system comprising an input source of energy, a recurrent network along which energy from said source is conveyed, said network being so constructed that the phase of currents existing in certain sections thereof as a result of applied input energy from said source is different, a plurality of output means coupled to different sections of said network, and a common means to which energy from said output means is applied.

26. A receiving system comprising an input source of energy, an elongated electrical periodic structure comprising more than two sections adapted to transfer electromagnetic waves throughout its length, a pair of output means connected respectively to different portions of said periodic structure, and a common means to which energy from said output means is applied.

27. A receiving system comprising an input source of energy, an elongated electrical conductive system adapted to transfer electromagnetic waves throughout its length, a plurality of output means coupled respectively to non-adjacent portions of said conductive system, and a common means for receiving electric energy transferred from said system through said output means.

28. A receiving system comprising a receiving conductor, a plural branched periodic structure, means for impressing waves received by said conductor upon said structure, a second plural branched periodic structure whose constituent elements are different from those of said first mentioned structure, and means for tranferring received waves from said first mentioned structure to said second mentioned structure, said means including a unidirectionally conducting device.

29. The method of receiving which comprises passing received waves through a plural branched periodic structure, impressing the waves traversing said structure upon a unidirectionally conducting device, impressing the waves traversing said device upon a second plural branched periodic structure composed of reactance elements having different constants than those constituting said first mentioned periodic structure, and utilizing the waves traversing said second structure to operate an indicating device.

30. A receiving system comprising a series recurring periodic network, input means coupled to a section of said network, and a unidirectionally conducting output means connected to a section of said network other than the terminal section most remote from said input means.

In witness whereof, I hereunto subscribe my name this 17th day of February A. D., 1916.

JOHN MILLS.